United States Patent
Douberley et al.

(10) Patent No.: US 9,928,055 B1
(45) Date of Patent: Mar. 27, 2018

(54) VALIDATING DEVELOPMENT SOFTWARE BY COMPARING RESULTS FROM PROCESSING HISTORIC DATA SETS

(71) Applicant: Sprint Communications Company L.P., Overland Park, KS (US)

(72) Inventors: David N. Douberley, Orlando, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 121 days.

(21) Appl. No.: 14/922,103

(22) Filed: Oct. 23, 2015

(51) Int. Cl.
G06F 9/44 (2006.01)
G06F 9/445 (2018.01)
H04B 7/26 (2006.01)
H04L 29/08 (2006.01)

(52) U.S. Cl.
CPC ............ G06F 8/65 (2013.01); H04B 7/2628 (2013.01); H04L 67/02 (2013.01)

(58) Field of Classification Search
CPC ....................................................... G06F 8/65
USPC ....................................................... 717/170
See application file for complete search history.

(56) References Cited

U.S. PATENT DOCUMENTS

| | | | | |
|---|---|---|---|---|
| 5,371,883 A | * | 12/1994 | Gross | G06F 11/3688 714/38.1 |
| 9,753,800 B1 | | 9/2017 | Jadunandan et al. | |
| 2007/0038676 A1 | | 2/2007 | Nagral et al. | |
| 2008/0270997 A1 | * | 10/2008 | Murray | G06F 11/3672 717/131 |
| 2009/0170472 A1 | * | 7/2009 | Chapin | H04W 28/18 455/410 |
| 2010/0005341 A1 | * | 1/2010 | Agarwal | G06F 11/3692 714/38.11 |
| 2010/0144367 A1 | * | 6/2010 | Goh | G01S 5/0294 455/456.1 |
| 2011/0140911 A1 | * | 6/2011 | Pant | H04B 3/546 340/870.02 |

(Continued)

OTHER PUBLICATIONS

Douberley, David N., et al., "Computer Platform to Collect, Marshal, and Normalize Communication Network Data for Use by a Network Operation Center (NOC) Management System," filed Oct. 23, 2015, U.S. Appl. No. 14/920,873.

(Continued)

*Primary Examiner* — Wei Zhen
*Assistant Examiner* — Lanny Ung

(57) ABSTRACT

A system for validating wireless communication network inventory software. The system comprises a processor, a non-transitory memory, and an application stored in the memory. When executed by the processor, the application processes a first data set with the first version of the software system to produce an authoritative data store, processes the first data set with a second version of the software system to produce a first trial data store, and processes a second data set with the second version of the software system to produce a second trial data store, wherein the second data set comprises later data than the first data set, and responsive to determining that the first trial data store matches the authoritative data store and determining that the second trial data store does not match the authoritative data store, designates the second data set changed.

15 Claims, 9 Drawing Sheets

(56) References Cited

U.S. PATENT DOCUMENTS

2013/0138538 A1    5/2013   Perry
2013/0238471 A1    9/2013   Maraz et al.
2013/0304530 A1   11/2013   Chodavarapu et al.
2014/0325000 A1   10/2014   Lorch et al.

OTHER PUBLICATIONS

Jadunandan, Kevin V., et al., entitled, "Communication Network Operations Management System and Method," filed Oct. 23, 2015, U.S. Appl. No. 14/920,874.
Notice of Allowance dated Nov. 1, 2017, U.S. Appl. No. 14/920,873, filed Oct. 23, 2015.

\* cited by examiner

US 9,928,055 B1

VALIDATING DEVELOPMENT SOFTWARE BY COMPARING RESULTS FROM PROCESSING HISTORIC DATA SETS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless communication network may comprise a radio access network (RAN) and a core network. The communication network provides wireless communication links to user equipment (UE) such as mobile phones and wireless enabled portable computers. The core network provides a variety of communication services such as authentication of UEs attempting to connect to the core network via the RAN, mobility management services, and premium communication services. A wireless communication network may comprise a very large number of network elements such as enhanced node Bs (eNBs) or cell towers, routers, servers, and the like. A wireless communication network may provide support for several different wireless technologies, for example a third generation wireless communication technology and a fourth generation wireless communication technology. Different network elements may be manufactured by different vendors or original equipment manufacturers (OEMs). The totality of network elements may be referred to as network inventory or inventory. It is desirable for wireless communication service providers to monitor and manage their communication network remotely, for example from a central network operations center (NOC) using computer based tools. Such computer based tools may be provided by computer software or applications executing on one or more computers.

SUMMARY

In an embodiment, a method of validating communication network equipment inventorying software is disclosed. The method comprises processing a first data set with a first version of a software system to produce a first authoritative communication network inventory data store by a computer system, wherein the first data set comprises information about an equipment inventory of the communication network, the first authoritative communication network inventory data store comprises definitions of topological relationships among communication network inventory items, and the communication network inventory items are associated with equipment manufactured by a plurality of different original equipment manufacturers (OEMs). The method further comprises processing a second data set with the first version of the software system to produce a second authoritative communication network inventory data store with the computer system, wherein the second data set comprises information about the inventory of the communication network at a later point in time than the inventory of the communication network represented by the first data set and the second authoritative communication network inventory data store comprises definitions of topological relationships among communication network inventory items at a later point in time than the inventory of the communication network represented by the first data set. The method further comprises processing the first data set with a second version of the software system to produce a first trial communication network inventory data store by the computer system, processing the second data set with the second version of the software system to produce a second trial communication network inventory data store by the computer system, comparing the first trial communication network inventory data store to the first authoritative communication network inventory data store by the computer system, and comparing the second trial communication network inventory data store to the second authoritative communication network inventory data store by the computer system. Responsive to determining that the first trial communication network inventory data store does not match the first authoritative communication network inventory data store or that the second trial communication network inventory data store does not match the second authoritative communication network inventory data store, the method further comprises designating by the computer system the second version of the software system erroneous and debugging and fixing the second version of the software system.

The method further comprises processing the second data set with a third version of the software system to produce a third trial communication network inventory data store by the computer system. The method further comprises comparing the third trial communication network inventory data store to the second authoritative communication network inventory data store by the computer system. The method further comprises processing a third data set with the third version of the software system to produce a fourth trial communication network inventory data store by the computer system, wherein the third data set comprises information about the equipment inventory of the communication network at a later point in time than the communication network inventory represented by the second data set and the fourth trial communication network inventory data store comprises definitions of topological relationships among communication network inventory items at a later point in time than the communication network inventory represented by the second data set. The method further comprises comparing the fourth trial communication network inventory data store to the second authoritative communication network inventory data store by the computer system and, responsive to determining that the third trial communication network inventory data store matches the second authoritative data store and to determining that the fourth trial communication network inventory data store does not match the second authoritative data store, designating by the computer system the third data set changed. The method further comprises revising the third version of the software system based on the changed third data set.

In another embodiment, a method of validating software is disclosed. The method comprises processing a first data set with a first version of a software system to produce a first authoritative data store by a computer system, wherein the first data set represents a communication network inventory, collecting a first authoritative set of benchmarks while processing the first data set with the first version of the software system by the computer system, wherein the benchmarks comprise processing duration, and processing a second data set with the first version of the software system to produce a second authoritative data store by the computer system, wherein the second data set represents the communication network inventory at a later point in time than the communication network inventory represented by the first data set. The method further comprises collecting a second authoritative set of benchmarks while processing the second data set with the first version of the software system by the computer system, processing the first data set with a second version of the software system to produce a first trial data store by the computer system, collecting a first trial set of benchmarks while processing the first data set with the second version of the software system by the computer system, and processing the second data set with the second version of the software system to produce a second trial data store by the computer system. The method further comprises collecting a second trial set of benchmarks while processing the second data set with the second version of the software system by the computer system, comparing by the computer system the first authoritative set of benchmarks to the first trial set of benchmarks, determining by the computer system if the processing durations of the first sets of benchmarks are within a predefined amount of time of each other, and determining by the computer system if the processing durations of the second sets of benchmarks are within the predefined amount of time of each other. When the processing durations of the first sets of benchmarks or the second sets of benchmarks differ by more than the predefined amount of time, the method further comprises sending by the computer system a notification report indicating the anomalous processing durations.

In an embodiment, a system for validating software is disclosed. The system comprises a processor, a non-transitory memory, and an application stored in the non-transitory memory. When executed by the processor, the application processes a first data set with the first version of the software system to produce an authoritative data store, wherein the first data set represents a communication network inventory, processes the first data set with a second version of the software system to produce a first trial data store, and processes a second data set with the second version of the software system to produce a second trial data store, wherein the second data set represents the communication network inventory at a point in time later than the communication network inventory represented by the first data set. The application further compares the first trial data store to the authoritative data store, compares the second trial data store to the authoritative data store, and, responsive to determining that the first trial data store matches the authoritative data store and determining that the second trial data store does not match the authoritative data store, designates the second data set changed.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
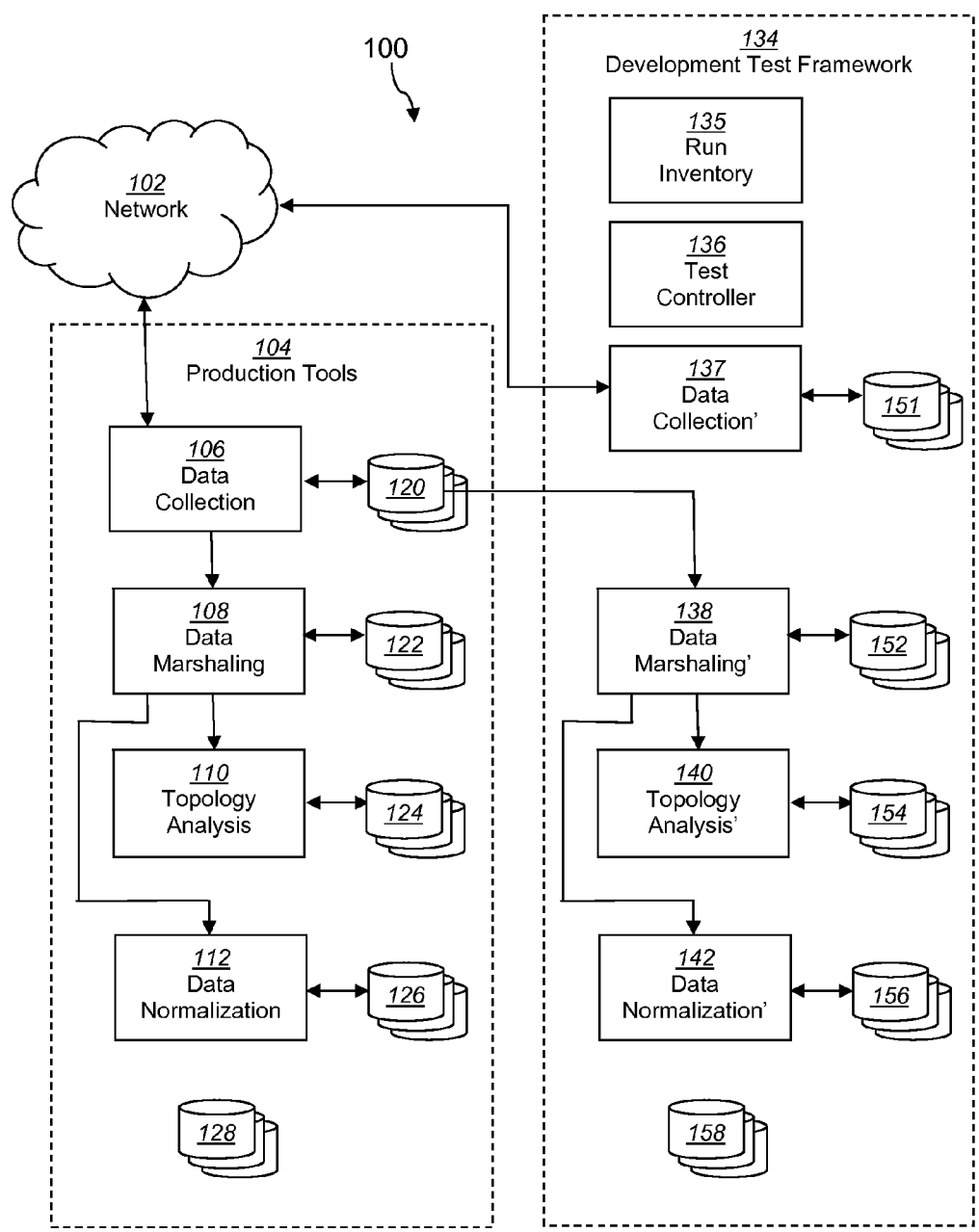
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Testing complex software systems is often challenging. The present disclosure teaches a system and methods for testing communication network equipment inventorying software. One challenge addressed by the teachings of this disclosure is testing software that analyzes network inventory that is rapidly changing at the same time that development inventorying software is rapidly changing. In this circumstance, when output of the software changes, the question then becomes are changes the result of changes in the developing software or the result of changes in the network inventory itself? While a specific communication network inventory software testing system is described as an embodiment herein, it is understood that the system and methods described may advantageously be applied to other kinds of software and other kinds of enterprise environments.

In an embodiment, the system under test comprises software that periodically builds a data store of communication network inventory. This inventory data store identifies network elements and components as well as topological relationships among the elements and components. The inventory data store comprises information about the elements and components. Because the subject communication network is changing rapidly as new network elements are brought into service and old network elements are taken out of service, the inventory data store may be rebuilt every day or on some other short-interval periodic basis. Network equipment may comprise, for example, enhanced node Bs (eNBs), base transceiver stations (BTSs), base station controllers (BSCs), mobile switching centers (MSCs), IP aggregators (IPAs), mobility management entities (MMEs), cell site routers, routers, home subscriber servers (HSSs), and other network elements.

The components may comprise component parts of network elements, for example, RF power amplifiers, circuit cards, antenna arrays, remote radio heads (RRHs), uninterruptable power supplies (UPSs), and physical plant monitoring systems. For further information about a communication network inventory system, see U.S. patent application Ser. No. 14/920,873 filed Oct. 23, 2015, entitled "Computer Platform to Collect, Marshal, and Normalize Communication Network Data for Use by a Network Operations Center (NOC) Management System," by David N. Douberley, et al., which is incorporated herein by reference in its entirety. A network operations center (NOC) management system may access the network inventory data store or network inventory data stores to provide a comprehensive network view to NOC operators. For further information about a NOC management system that accesses a network inventory data store see U.S. patent application Ser. No. 14/920,874 filed Oct. 23, 2015 entitled "Communication Network Operations Management System and Method," by Kevin V. Jadunandan, et al., which is incorporated herein by reference in its entirety.

Production network inventory software (e.g., inventory software that has been tested and deemed ready for operational use in the enterprise) periodically analyzes raw data about network elements and components to generate current inventory data stores. Production software and artifacts may also be referred to as authoritative or baseline software and artifacts. The generated data stores may be time and date stamped to indicate the date of the raw data or data set that they were built from. Alternatively or additionally, the generated data stores may be named with a name that embeds or otherwise encodes the date and time of the raw data or data set that they depend upon. A NOC management tool may rely on the most recently generated inventory data stores, but earlier generated data stores are retained as historic records.

Development network inventory software (e.g., inventory software that has been coded but not yet released for production use, perhaps because it has not been adequately tested) may be executed in an off-line environment to process two or more historical raw data sets to produce development inventory data stores. Development software and artifacts may also be referred to as trial software and artifacts. The development inventory data stores can be compared with the corresponding historic data stores. If the data stores generated based on the same raw data sets match, the development inventory software may be deemed to pass that test. If the data stores do not match, the results indicate that the development software is likely in error. The specific differences determined between the development inventory data stores and the corresponding historic data stores may be used to help localize the location of errors or bugs in the development software.

In addition to the above scenario, the disclosed system can be used to identify when the network inventory has changed in a way that warrants revising the inventory software. If the development network inventory software has been confirmed to produce results comparable to those of the production network inventory software, the development software may be deemed operable or at least provisionally operable (e.g., other tests may desirably be run, and the provisionally operable development software may yet fail one of those other tests). That development network inventory software may be executed to process a new raw data set to produce new development inventory data stores. The new development inventory data stores may be compared to the previous inventory data stores produced by the production network inventory software and if they differ—because the development network inventory software is deemed operable—it can be inferred that the network inventory has changed and updating of inventory software may be called for. In some cases, in this test scenario, the development network inventory software may experience an exception, halt, or may crash when encountering the new raw data. In this case, a report on the test outcome may be emailed to developers, managers, or other stake holders, and that report may be used to determine how to modify the development network inventory software to handle the new inventory data while still working with the old inventory data.

It will be appreciated that the inferences identified above may not always be correct—there may be other unusual causes involved. Notwithstanding, it is expected that these inferences will more often than not provide valuable guidance to the tester in validating the development software or identifying likely problems in the development software. When the development software has been deemed to have failed the test, the system may automatically generate and send a report to involved developers of the failed test results.

A run inventory component may direct and monitor the development inventory software, causing the development inventory software to execute and process raw data sets and to collect processing statistics on the processing performed by the development inventory software execution. The statistics may comprise an amount of time taken to perform the processing or portions of the processing, an amount of memory consumed by the processing (main memory allocated to processes at run time), a number of threads of execution dynamically spawned by the processing, and the like. These statistics may be compared by a test controller component with corresponding statistics associated with the processing performed by the production inventory software, and when the statistics vary from each other by more than a threshold amount of variance, the development software may be deemed faulty and/or provide an automated report of the anomaly to involved developers.

Turning now to FIG. 1, a system 100 is described. In an embodiment, system 100 comprises a communication network 102, a set of production software tools 104, and a development test framework 134. The production software tools 104 may comprise a production data collection component 106, a production data marshaling component 108, a production topology analysis component 110, and a production data normalization component 112. The network 102 comprises a communication network, for example a wireless communication network operated by a wireless communication service provider. The network 102 may comprise a radio access network (RAN) and a core network. The network 102 comprises network elements that may support different technologies or generations and that may be manufactured by different original equipment manufacturers. In an embodiment, the production software tools 104 process data obtained about the network 102 to populate various information about network equipment into network equipment inventory data stores 120, 122, 124, and 126. In an embodiment, the data stores 120, 122, 124, and 126 may comprise information in different formats stored in files. In an embodiment, the network equipment inventory data stores 120, 122, 124, and 126 comprise an archive of files.

As shown in FIG. 1, each of the data stores 120, 122, 124, 126 may have multiple copies corresponding to different data stores built at different times based on different raw data collected from the network 102. Thus, a first version of the first data store 120 may be built by the production data collection component 106 on Monday based on the network inventory as it stood on Monday, a second version of the first data store 120 may be built by the production data collection component 106 on Tuesday based on the network inventory as it stood on Tuesday, and a third version of the first data store 120 may be built by the production data collection component 106 on Wednesday based on the network inventory as it stood on Wednesday.

The production data collection component 106 processes information about network elements accessed from the network 102 to produce raw inventory data that is stored in a first production inventory data store 120. The production data marshaling component 108 transforms the raw inventory data collected by the data collection component 106 into data structures that are stored in a second production inventory data store 122. The production topology analysis component 110 analyzes the data in the data structures to determine physical and logical hierarchical or parent-child relationships among inventory items and stores the topology information in a third production inventory data store 124. The production data normalization component 112 analyzes the data in the data structures to transcode the data into a common or normalized format and in common or normalized units and stores the normalized inventory information in a fourth production inventory data store 126. As the production components 106, 108, 110, 112 execute, processing statistics are collected and stored in a fifth production inventory data store 128. The processing statistics may comprise execution durations, a size of the inventory data stores, memory consumed during processing (amount of main memory dynamically allocated for processing), number of dynamically allocated threads of execution, and the like.

The development test framework 134 is used to test development versions of some of the production tools 104: a data collection component 137 that is a revised version of the production data collection component 106, a development data marshaling component 138 that is a revised version of the production data marshaling component 108, a development topology analysis component 140 that is a revised version of the production topology analysis component 110, and a development data normalization component 142 that is a revised version of the production normalization component 112. In an embodiment, the development test framework 134 does not test a development data collection component (not shown). The development components may also be referred to as trial components in some contexts. In some embodiments, the development components 138, 140, and 142 may be revised versions of components that are not production versions but that are validated and/or trusted baseline versions. Thus, in an embodiment, component 106 is a baseline data collection component, component 108 is a baseline data marshaling component, component 110 is a baseline topology analysis component, and component 112 is a baseline data normalization component.

The development test framework 134 may be considered to comprise the development components 137, 138, 140, 142, a run inventory component 135, and a test controller component 136. Alternatively, the development test framework 134 may be considered to comprise the run inventory component 135 and the test controller component 136 and not comprise the development components 137, 138, 140, 142 (which instead may be considered to be the system under test or an input to a test mediated by run inventory component 135 and the test controller component 136 and/or the development test framework 134). The run inventory component 135 executes one or more of the components 137, 138, 140, and 142 to generate one or more of the data stores 151, 152, 154, 156, 158, and the test controller component 136 evaluates the results of the execution by comparing one or more of the data stores 151, 152, 154, 156, 158 to corresponding data stores 120, 122, 124, 126, 128.

The components 106, 108, 110, 112 may execute on a first computer system and the run inventory component 135, the test controller component 136, and the development components 137, 138, 140, 142 may execute on a second computer system. Alternatively, the production components 106, 108, 110, 112, the run inventory component 135, the test controller component 136, and the development components 137, 138, 140, 142 may execute on the same computer system. Computer systems are described further hereinafter.

The run inventory component 135 causes the development data collection component 137 to execute and to process data accessed from the network 102 and store the results in a fifth development inventory data store 151. It is noted that the data collected in the fifth development inventory data store 151 by the development data collection component 137 may be unsynchronized with data in the data store 120, and hence direct comparison between the data stores 120 and 151 may not be meaningful. The testing by the test controller component 136 of the development data collection component 137, in some embodiments, may be limited to verifying that data was collected by the development data collection component 137, for example verifying that a volume of data exceeding a predefined data volume threshold was collected but not verify that the content of the data is valid.

The run inventory component 135 causes the development data marshaling component 138 to execute and to process raw data accessed from the first data store 120, transforming the raw data into data structures that it stores in a first development inventory data store 152. The run inventory component 135 causes the development topology analysis component 140 to execute and to analyze the data stored in the data structures produced by the development data marshaling component 138 to determine physical and logical hierarchical or parent-child relationships among inventory items and to store the topology information in a second development inventory data store 154. The run inventory component 135 causes the development data normalization component 142 to execute and to analyze the data in the data structures to transcode the data into common and/or normalized format and in common or normalized units and to store the normalized inventory information in a third development inventory data store 156. The run inventory component 135 further collects processing statistics from the processing performed by the development components 137, 138, 140, and 142 and stores the statistics in a fourth development inventory data store 158. The data stores 152, 154, 156, 158 may comprise information in different formats stored in files. In an embodiment, the data stores 152, 154, 156, 158 comprise an archive of files. The processing statistics may comprise execution durations, size of the data stores, memory consumed during processing (amount of main memory dynamically allocated for processing), number of dynamically allocated threads of execution, and the like. As shown in FIG. 1, each of the data stores 152, 154, 156, 158 may have multiple copies corresponding to different data stores built at different times based on processing data accessed from different the first production data store 120 associated with raw data collected by the production data collection component 106 on different dates.

The first development inventory data store 152 corresponds to the second production inventory data store 122 and should, if the development data marshaling component 138 is correct, contain inventory information identical to the inventory information stored in the second production inventory data store 122. The second development inventory data store 154 corresponds to the third production inventory data store 124 and should, if the development topology analysis component 140 is correct, contain inventory information identical to the inventory information stored in the third production inventory data store 124. The third development inventory data store 156 corresponds to the fourth production inventory data store 126 and should, if the development data normalization component 142 is correct, contain inventory information identical to the inventory information stored in the fourth production inventory data store 126. The fourth development inventory data store 158 corresponds to the fifth production inventory data store 128 and should, if the development modules are correct, contain processing metrics that are at least approximately identical to the processing metrics stored in the fifth production inventory data store 128.

Figure 2:
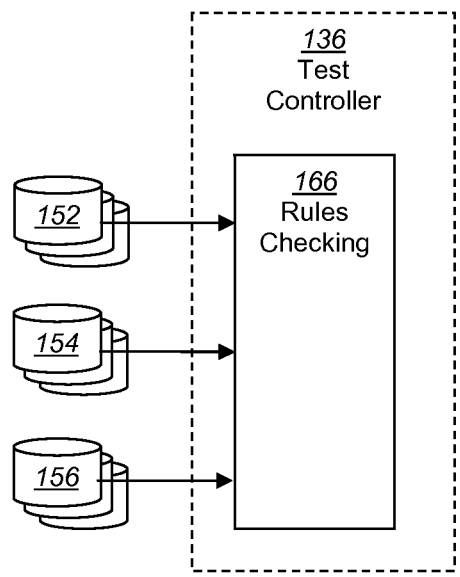
FIG. 2 is a block diagram of a function of a test controller according to an embodiment of the disclosure.

Turning now to FIG. 2, the test controller 136 is further described. In an embodiment, the test controller 136 comprises a rules checking component 166. When the development components 137, 138, 140, 142 have completed processing, the test controller 136 executes the rules checking component 166. The rules checking component 166 analyzes the inventory data stored to the development data stores 152, 154, 156 to determine if the data conforms to rules defined for the data. The rules may define allowed value ranges for specific inventory items. The rules may define allowed numbers of children or parents in topological data for specific inventory items. The rules may identify a maximum number of rows with specific columns empty that are allowed. The rules may check for uniqueness of some elements of data stores 152, 154, and 156 such as unique identifiers or unique primary keys. The rules may define other aspects of the inventory data.

If one or more of the data stores 152, 154, 156 is found to violate any rules, the development components 137, 138, 140, 142 are deemed to have failed the test. Alternatively, if the inventory data stored in the first development data store 152 does not conform to any rules, the development data marshalling component 138 is deemed to have failed the test, and the development topology analysis component 140 and the development data normalization component 142 are deemed to be pending rules checking. If the inventory data stored in the first development data store 152 does conform to the rules, but the inventory data stored in the second development data store 154 does not conform to any rules, the development data marshalling component 138 is deemed to have passed rules checking, the development topology analysis component 140 is deemed to have failed the test, and the development data normalization component 142 is deemed to be pending rules checking. If the inventory data stored in the first development data store 152 and the inventory data stored in the second development data store 154 do conform to the rules, but the inventory data stored in the third development data store 156 does not conform to any rules, the development data marshaling component 138 and the development topology analysis component 140 are deemed to have passed rules checking and the development data normalization component 142 is deemed to have failed the test. In an embodiment, when development components 137, 138, 140, 142 pass the rules check, they need not be rules checked again.

Figure 3:
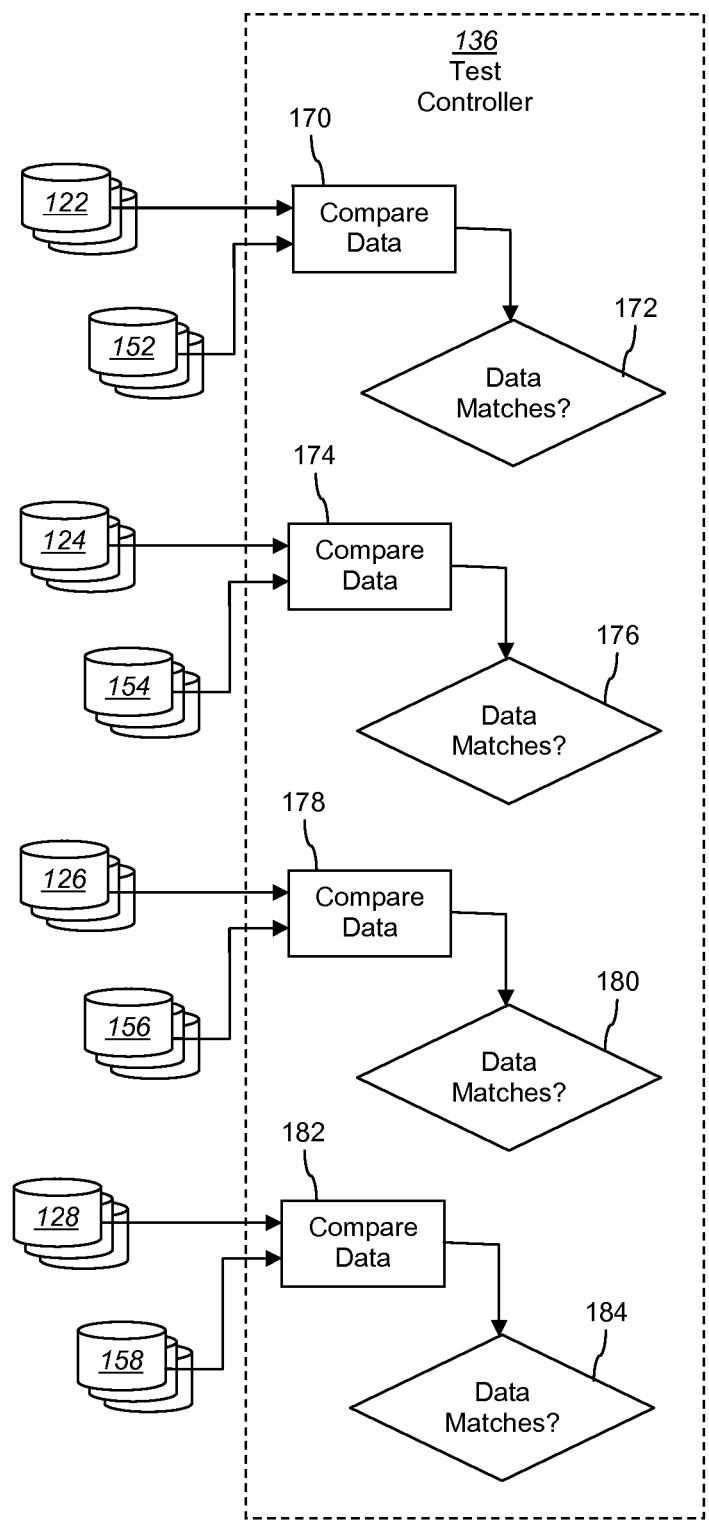
FIG. 3 is a block diagram of other functions of the test controller according to an embodiment of the disclosure.

Turning now to FIG. 3, the test controller 136 is further described. After the development data stores 152, 154, 156 have been processed by the rules checking component 166 and have passed the rules check, the development data stores 152, 154, 156, and 158 are compared to corresponding production data stores 122, 124, 126, 128. At block 170, the test controller 136 compares the inventory data stored in the first development inventory data store 152 to the inventory data stored in the second production inventory data store 122. At block 172, if the inventory data matches, the development data marshalling component 138 may be deemed to pass the test provisionally otherwise the development data marshalling component 138 is deemed to have failed the test. At block 174, the test controller 136 compares the inventory data stored in the second development inventory data store 154 to the inventory data stored in the third production inventory data store 124. At block 176, if the inventory data matches, the development topology analysis component 140 may be deemed to pass the test provisionally otherwise the development topology analysis component is deemed to have failed the test. At block 178, the test controller 136 compares the inventory data stored in the third development inventory data store 156 to the inventory data stored in the fourth production inventory data store 126. At block 180, if the inventory data matches, the development data normalization component 140 may be deemed to pass the test provisionally otherwise the development data normalization component 142 is deemed to have failed the test. At block 182 the test controller 136 compares metrics stored in the development processing metrics data store 158 to the metrics stored in the production metrics data store 128. At block 184, if the metrics match within predefined limits or thresholds and if none of the development components 138, 140, 142 have previously failed the test, the development components 138, 140, 142 may be deemed to pass the test.

Figure 4:
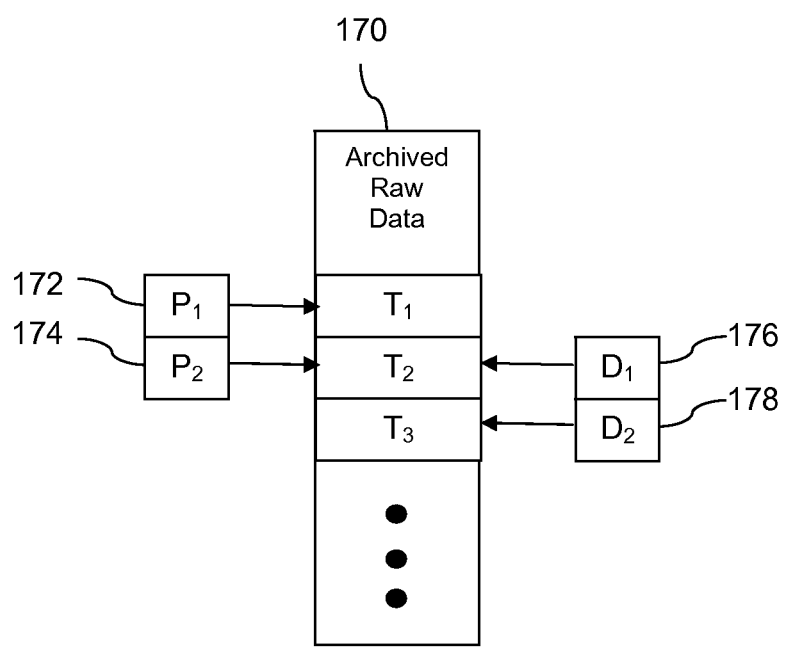
FIG. 4 is a block diagram of data sets.

Turning now to FIG. 4, method of testing is described. Raw inventory data may be collected from the network 102, for example by the production data collection component 106, at times $T_1$, $T_2$, $T_3$, . . . and stored in archived raw data store 170. A first set of production inventory data stores $P_1$ 172 may be built by production modules 108, 110, and 112 by processing the $T_1$ raw inventory data, and a second set of production inventory data stores $P_2$ 174 may be built by the same versions of the production modules 108, 110, and 112 by processing $T_2$ raw inventory data. A first set of development inventory data store $D_1$ 176 may be built by development modules 138, 140, and 142 processing $T_2$ raw inventory data, and a second set of development inventory data stores $D_2$ 178 may be built by the same versions of the development modules 138, 140, and 142 processing $T_3$ raw inventory data. It is understood that the production inventory data stores $P_1$ and $P_2$ comprise a data store built by the production data marshalling component 108, a data store built by the production topology analysis component 110, and a production data store built by the production data normalization component 112 and that the development inventory data stores D1 and D2 comprise a data store built by the development data marshalling component 138, a data store built by the development topology analysis component 140, and a data store built by the development data normalization component 142.

The rules checking described above with reference to FIG. 2 may be performed on each of $D_1$ 176 and $D_2$ 178. If the $D_1$ 176 and $D_2$ 178 pass rules checking, they may be compared against production inventory data store $P_2$ 174 according to the process described above with reference to FIG. 3. It is a teaching of the present disclosure that comparing the results of these comparison tests may direct developers to sources of errors. For example, if the production inventory data stores $P_2$ 174 match the development inventory data stores $D_1$ 176 but the production inventory data stores $P_2$ 174 do not match the development inventory data stores $D_2$ 178, it may be surmised that the raw inventory data at $T_3$ differs from the raw inventory data at $T_2$ and hence adaptation of inventory data collection components 106 may be called for. This follows from the facts that the production modules are assumed to be correct, that the production modules and development modules processing the same raw inventory data produced the same inventory data stores, but the development modules processing different raw inventory data produced different inventory data stores.

On the other hand, if the production inventory data stores $P_2$ 174 do not match the development inventory data stores $D_1$ 176, it may be surmised that an error is present in one of the development software implementing one of the components 138, 140, 142. This follows from the facts that the production modules are assumed to be correct and both production and development modules processed the same raw inventory data. This kind of test analysis can be particularly effective in a development environment where the network inventory is changing rapidly at the same time that the development versions of the modules 138, 140, 142 are changing. It is understood that a greater number than two sets of production inventory data stores may be compared with a greater number of sets of development inventory data stores.

It will be apparent to those skilled in the art that the teachings of this disclosure may be employed to other software development environments than network inventory data store creation. The technique of saving or archiving sets of production or baseline software results over different periods of time acting on different sets of input data (the network inventory embodied in the network 102 is considered the input here or alternatively the raw inventory data produced by the production data collection component 106), executing development software on the same sets of input data to generate sets of development results, and then comparing associated production results to corresponding development results may be applied in many other environments.

Figure 5A:
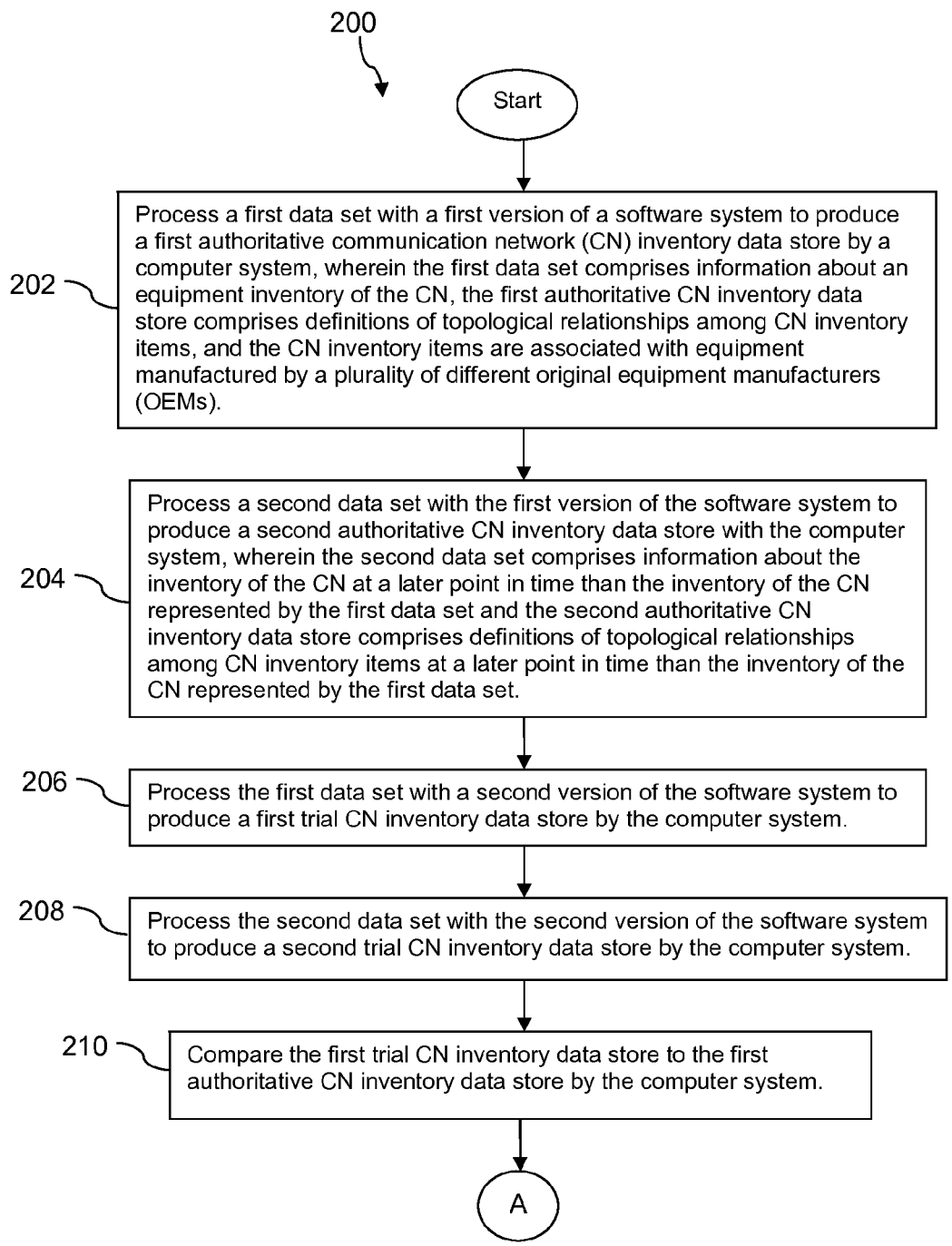
FIG. 5A, FIG. 5B, and FIG. 5C is a flow chart of a method according to an embodiment of the disclosure.
Figure 5B:
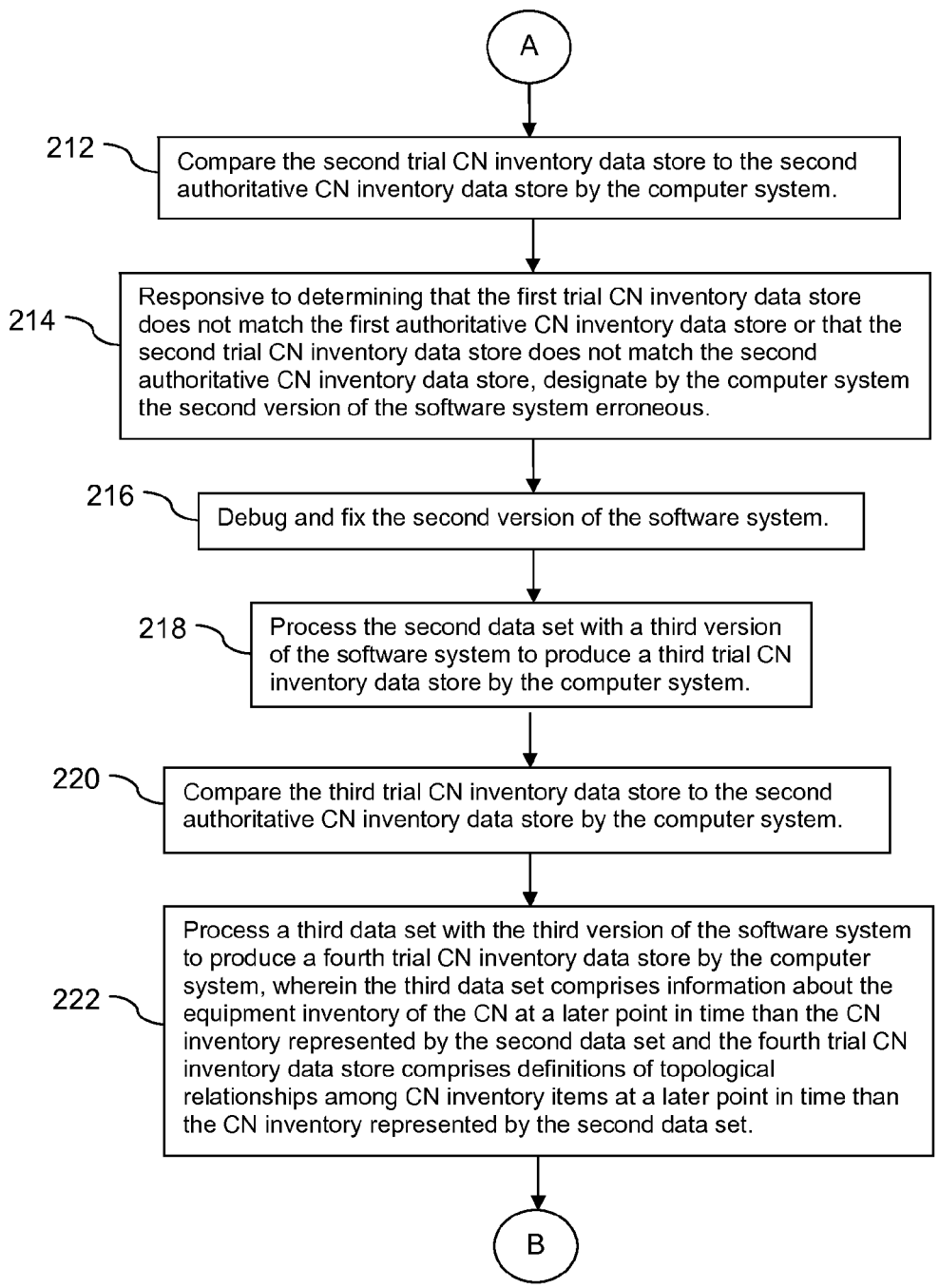
Figure 5C:
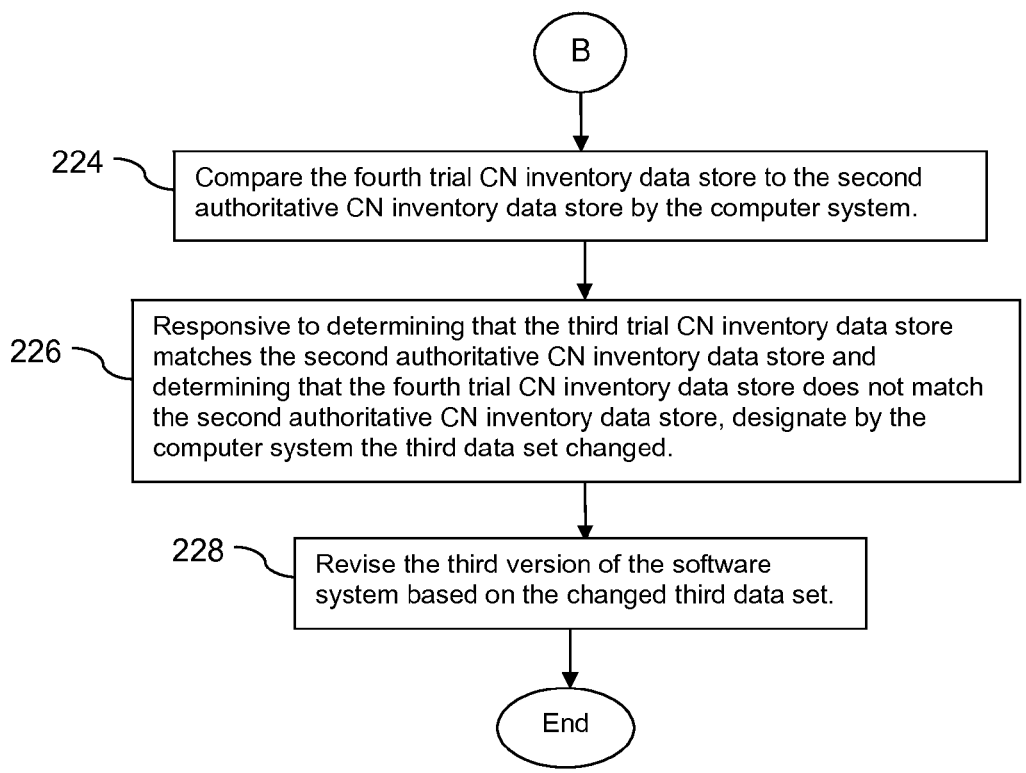

Turning now to FIG. 5A, FIGS. 5B, and 5C, a method 200 is described. At block 202, a first data set (e.g., the first production data store 120 developed by the production data collection component 106 processing raw data obtained from the network 102 at a first point in time) is processed by a computer system with a first version of a software system to produce a first authoritative communication network inventory data store, wherein the first data set comprises information about an equipment inventory of the communication network, the first authoritative inventory data store comprises definitions of topological relationships among inventory items, and the inventory items are associated with equipment manufactured by a plurality of different original equipment manufacturers (OEMs). The first data store may comprise the production data stores 122, 124, 126 described above with reference to FIG. 1 (said in other words, the first data store may comprise a plurality of component data stores, i.e., production data stores 122, 124, 126). The first authoritative communication network inventory data store may be stored in an archive or data store.

At block 204, a second data set (e.g., the first production data store 120 developed by the production data collection component 106 processing raw data obtained from the network 102 at a second, later point in time) is processed by the computer system with the first version of the software system to produce a second authoritative communication network inventory data store, wherein the second data set comprises information about the inventory of the communication network at a later point in time than the inventory of the communication network equipment represented by the first data set and the second authoritative communication network inventory data store comprises definitions of topological relationships among inventory items at a later point in time than the inventory of the communication network represented by the first data set. The second authoritative communication network inventory data store may comprise the production data stores 122, 124, 126, generated at a later time.

At block 206, the first data set is processed by the computer system with a second version of the software system to produce a first trial communication network inventory data store. At block 208, the second data set is processed by the computer system with the second version of the software system to produce a second trial communication network inventory data store. At block 210, the first trial communication network inventory data store is compared by the computer system to the first authoritative communication network inventory data store. At block 212, the second trial communication network inventory data store is compared by the computer system to the second authoritative communication inventory data store. At block 214, responsive to determining that the first trial communication network inventory data store does not match the first authoritative communication network inventory data store or that the second trial communication network inventory data store does not match the second authoritative communication network inventory data store, the computer system designates the second version of the software system erroneous. At block 216, the second version of the software system is debugged and fixed. The debugging may look into what one of the different constituent data stores of the authoritative communication network inventory data stores (e.g., one of 152, 154, 156) is associated with the errors and use the specific errors experienced to further localize a source of the error in the development software. For example, it may be possible to isolate the error to one of the development data marshaling component 138, the development topology analysis component 140, or the development data normalization component 142, thereby limiting the field of potential error source. At 218, the second data set is processed by the computer system with a third version of the software system to produce a third trial communication network inventory data store. At block 220, the third trial communication network inventory data store is compared by the computer system to the second authoritative communication network inventory data store.

At block 222, a third data set is processed by the computer system with the third version of the software system to produce a fourth trial communication network inventory data store, wherein the third data set comprises information about the equipment inventory of the communication network at a later point in time than the communication network inventory represented by the second data set and the fourth trial communication network inventory data store comprises definitions of topological relationships among communication network inventory items at a later point in time than the communication network inventory represented by the second data set. At block 224, the fourth trial communication network inventory data store is compared by the computer system to the second authoritative communication network inventory data store. At block 226, responsive to determining that the third trial communication network inventory data store does matches the second authoritative communication network inventory data store and to determining that the fourth trial communication network inventory data store does not match the second authoritative communication network inventory data store, the computer system designates the third data set changed. At block 228, the third version of the software system is revised based on the changed third data set.

Figure 6A:
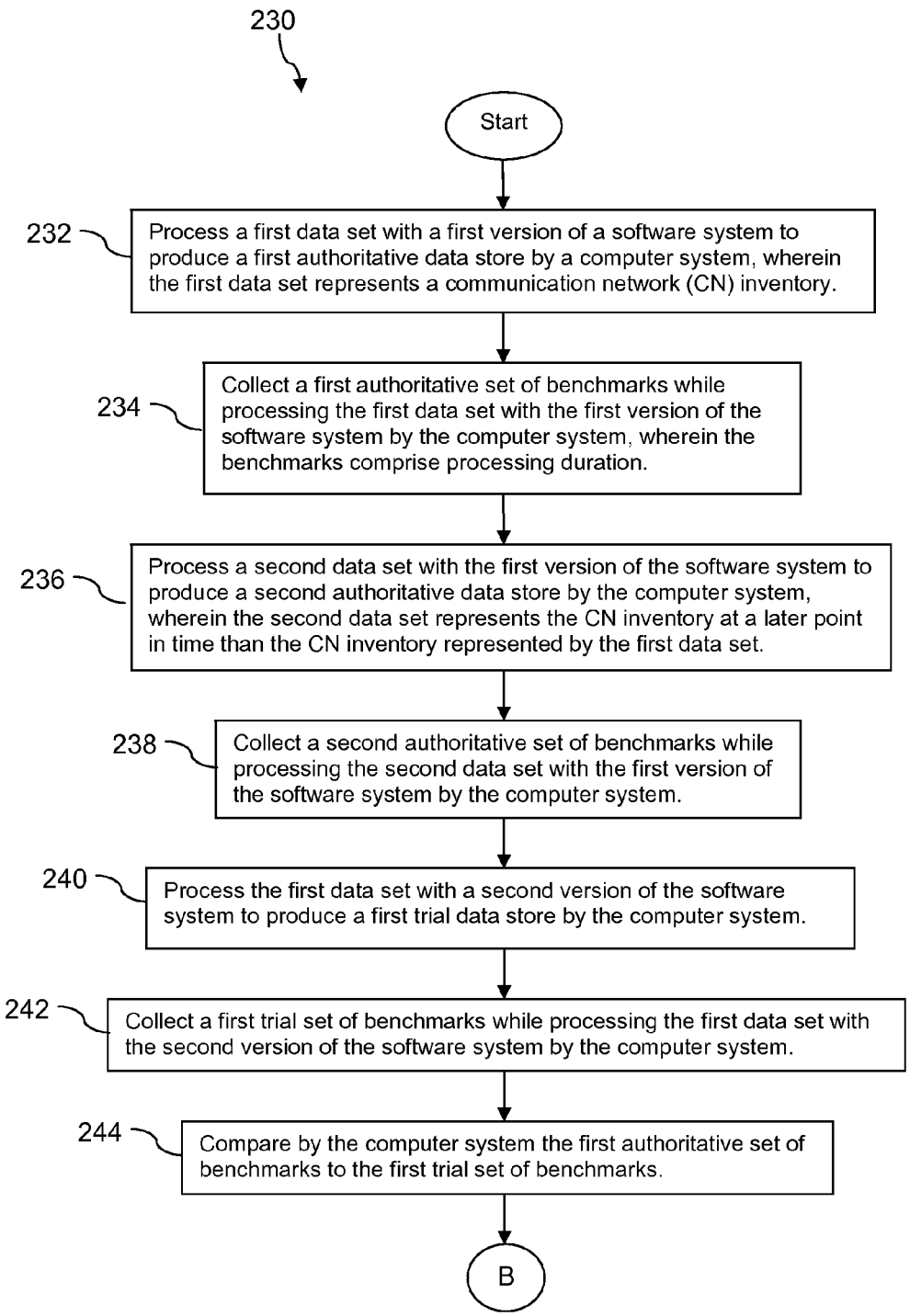
FIG. 6A and FIG. 6B is a flow chart of another method according to an embodiment of the disclosure.
Figure 6B:
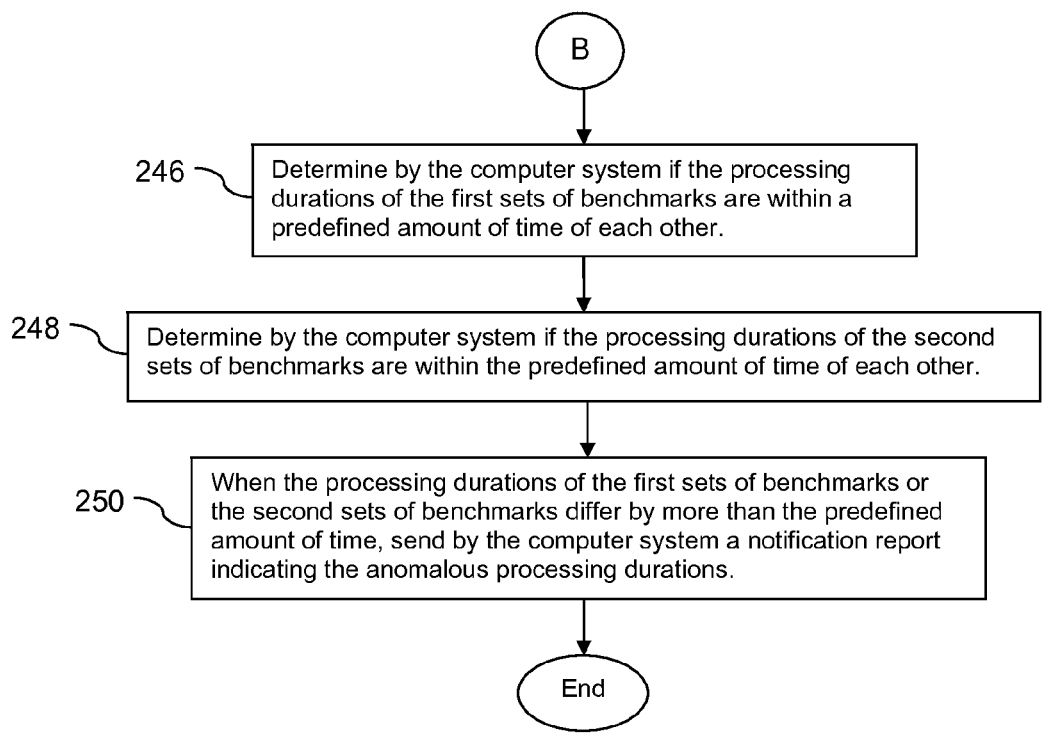

Turning now to FIG. 6A and FIG. 6B, a method 230 is described. At block 232, a first data set is processed with a first version of a software system by a computer system to produce a first authoritative data store, wherein the first data set represents a radio access network (RAN) inventory. At block 234, a first authoritative set of benchmarks is collected by the computer system while processing the first data set with the first version of the software system, wherein the benchmarks comprise processing duration. It is understood that the benchmarks may comprise additional information also, such as a size of data stores, an amount of memory consumed during execution, a number of threads of execution spawned during execution, and the like. At block 236, a second data set is processed by the computer system with the first version of the software system to produce a second authoritative data store, wherein the second data set represents the communication network inventory at a later point in time than the communication network inventory represented by the first data set. At block 238, a second authoritative set of benchmarks is collected by the computer system while processing the second data set with the first version of the software system.

At block 240, the first data set is processed by the computer system with a second version of the software system to produce a first trial data store. At block 242, a first trial set of benchmarks is collected by the computer system while processing the first data set with the second version of the software system. At block 244, the computer system compares the first authoritative set of benchmarks to the first trial set of benchmarks. At block 246, the computer system determines if the processing durations of the first sets of benchmarks are within a predefined amount of time of each other. At block 248, the computer system determines if the processing durations of the second sets of benchmarks are within the predefined amount of time of each other. At block 250, when the processing durations of the first sets of benchmarks or the second sets of benchmarks differ by more than the predefined amount of time, the computer system sends a notification report indicating the anomalous processing durations. Similar comparisons of other processing metrics between the data stores—for example comparisons of size of resultant data stores, amount of memory consumed during execution, number of threads of execution—with reference to suitable thresholds may also be used to identify anomalous processing outcomes.

Figure 7:
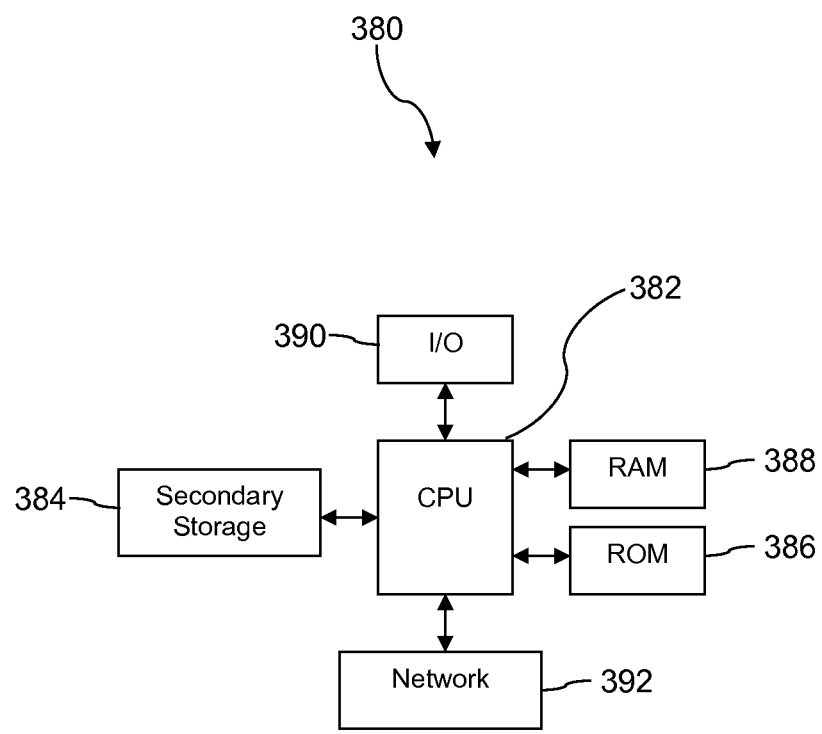
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of validating communication network equipment inventorying software, comprising:
processing a first data set with a first version of a software system to produce a first authoritative communication network inventory data store by a computer system, wherein the first data set comprises information about an equipment inventory of the communication network, the first authoritative communication network inventory data store comprises definitions of topological relationships among communication network inventory items, and the communication network inventory items are associated with equipment manufactured by a plurality of different original equipment manufacturers (OEMs);
processing a second data set with the first version of the software system to produce a second authoritative communication network inventory data store with the computer system, wherein the second data set comprises information about the inventory of the communication network at a later point in time than the inventory of the communication network represented by the first data set and the second authoritative communication network inventory data store comprises definitions of topological relationships among communication network inventory items at a later point in time than the inventory of the communication network represented by the first data set;
processing the first data set with a second version of the software system to produce a first trial communication network inventory data store by the computer system;
processing the second data set with the second version of the software system to produce a second trial communication network inventory data store by the computer system;
comparing the first trial communication network inventory data store to the first authoritative communication network inventory data store by the computer system;
comparing the second trial communication network inventory data store to the second authoritative communication network inventory data store by the computer system;
responsive to determining that the first trial communication network inventory data store does not match the first authoritative communication network inventory data store or that the second trial communication network inventory data store does not match the second authoritative communication network inventory data store, designating by the computer system the second version of the software system erroneous;
debugging and fixing the second version of the software system;
processing the second data set with a third version of the software system to produce a third trial communication network inventory data store by the computer system;
comparing the third trial communication network inventory data store to the second authoritative communication network inventory data store by the computer system;
processing a third data set with the third version of the software system to produce a fourth trial communication network inventory data store by the computer system, wherein the third data set comprises information about the equipment inventory of the communication network at a later point in time than the communication network inventory represented by the second data set and the fourth trial communication network inventory data store comprises definitions of topological relationships among communication network inventory items at a later point in time than the communication network inventory represented by the second data set;
comparing the fourth trial communication network inventory data store to the second authoritative communication network inventory data store by the computer system;
responsive to determining that the third trial communication network inventory data store matches the second authoritative data store and to determining that the fourth trial communication network inventory data store does not match the second authoritative data store, designating by the computer system the third data set changed; and
revising the third version of the software system based on the changed third data set.

2. The method of claim 1, wherein processing the data sets by the versions of the software system to produce the communication network inventory data stores comprises detecting compressed data in the data sets;
uncompressing the compressed data;
converting data in the data sets and the uncompressed data to a plurality of data structures;
analyzing the converted data to determine parent-child relationships among communication network inventory equipment;
storing the parent-child relationships in the communication network inventory data stores;
transcoding the converted data to a common format; and
storing the transcoded data in the communication network inventory data stores.

3. The method of claim 1, wherein the communication network inventory items comprise one or more of an enhanced node B (eNB), a base transceiver station (BTS), a base station controller (BSC), a mobile switching center (MSC), a cell site router (CSR), a router, a mobility management entity (MME), an Internet Protocol (IP) aggregator (IPA), a remote radio head (RRH), a physical plant monitor, a circuit card, a radio frequency power amplifier, and a radio transceiver.

4. The method of claim 3, wherein the communication network inventory data stores define a logical parent-child relationship between an MME and an eNB.

5. The method of claim 3, wherein the communication network inventory data stores define a logical parent-child relationship between an IPA and a CSR.

6. The method of claim 3, wherein the communication network inventory data stores define a physical parent-child relationship between an eNB and a plurality of circuit cards.

7. The method of claim 3, wherein the communication network inventory data stores define a physical parent-child relationship between an eNB and a RRH.

8. A method of validating software, comprising:
processing a first data set with a first version of a software system to produce a first authoritative data store by a computer system, wherein the first data set represents a communication network inventory;
collecting a first authoritative set of benchmarks while processing the first data set with the first version of the software system by the computer system, wherein the benchmarks comprise processing duration;
processing a second data set with the first version of the software system to produce a second authoritative data store by the computer system, wherein the second data set represents the communication network inventory at a later point in time than the communication network inventory represented by the first data set;
collecting a second authoritative set of benchmarks while processing the second data set with the first version of the software system by the computer system;
processing the first data set with a second version of the software system to produce a first trial data store by the computer system;
collecting a first trial set of benchmarks while processing the first data set with the second version of the software system by the computer system;
processing the second data set with the second version of the software system to produce a second trial data store by the computer system;
collecting a second trial set of benchmarks while processing the second data set with the second version of the software system by the computer system;
comparing by the computer system the first authoritative set of benchmarks to the first trial set of benchmarks;
determining by the computer system if the processing durations of the first sets of benchmarks are within a predefined amount of time of each other;
determining by the computer system if the processing durations of the second sets of benchmarks are within the predefined amount of time of each other; and
when the processing durations of the first sets of benchmarks or the second sets of benchmarks differ by more than the predefined amount of time, sending by the computer system a notification report indicating the anomalous processing durations.

9. The method of claim 8, wherein the processing metrics further comprise main memory used during the processing, and further comprising:

determining by the computer system if the main memory consumed by processing recorded by the first sets of metrics differ by more than a predefined memory variance and if the main memory consumed by processing recorded by the second sets of metrics differ by more than the predefined memory variance; and
when the memory variance of either the first set of metrics or the second set of metrics exceeds the predefined memory variance, sending by the computer system a notification report indicating the memory utilization variance.

10. The method of claim 8, wherein the processing metrics further comprise a number of execution threads used during processing, and further comprising:
determining by the computer system if the number of threads spawned during processing recorded by the first sets of metrics differ by more than a predefined thread count variance and if the number of threads spawned during processing recorded by the second sets of metrics differ by more than the predefined thread count variance; and
when the thread count variance of either the first set of metrics or the second set of metrics exceeds the predefined thread count variance, sending by the computer system a notification report indicating the thread count variance.

11. The method of claim 8, wherein the communication network inventory comprises long term evolution (LTE) network equipment and code division multiple access (CDMA) network equipment.

12. The method of claim 8, wherein communication network inventory comprises network equipment produced by at least three different original equipment manufacturers.

13. The method of claim 8, further comprising analyzing the first trial data store and the second trial data store to determine compliance of a content of the trial data stores with communication network inventory data rules.

14. The method of claim 13, wherein one of the rules comprises checking data values for conformity to a value range rule.

15. The method of claim 13, wherein one of the rules comprises checking topological relationships among communication network inventory data items for conformity to a topology rule.

* * * * *